United States Patent [19]
Mayer

[11] Patent Number: 5,635,592
[45] Date of Patent: Jun. 3, 1997

[54] PROCESS FOR THE CONTINUOUS PREPARATION OF ROSINS

[75] Inventor: Gunter Mayer, Koenigstein, Germany

[73] Assignee: Hoechst Aktiengesellschaft, Germany

[21] Appl. No.: 526,629

[22] Filed: Sep. 11, 1995

[30] Foreign Application Priority Data

Oct. 1, 1994 [DE] Germany ............ 44 35 284.0

[51] Int. Cl.⁶ .................................................. C09F 1/00
[52] U.S. Cl. .................. 530/210; 530/211; 526/290; 156/31.41; 106/31.73; 106/218
[58] Field of Search .................. 530/210, 211; 526/290; 106/20 R, 191, 198

[56] References Cited

U.S. PATENT DOCUMENTS

| | | | |
|---|---|---|---|
| 3,993,626 | 11/1976 | Laurito | 106/191 |
| 4,056,498 | 11/1977 | Laurito | 526/290 |
| 4,540,635 | 9/1985 | Ronge et al. | 530/210 |
| 5,208,319 | 5/1993 | Schilling | 530/210 |
| 5,225,527 | 7/1993 | Fallmann et al. | 530/210 |

*Primary Examiner*—James J. Seidleck
*Assistant Examiner*—Duc Truong
*Attorney, Agent, or Firm*—Bierman, Muserlian and Lucas LLP

[57] ABSTRACT

Disclosed is a process for the continuous production of rosins which have consistent, uniform properties and are suitable for use as printing ink resins, the process comprising reacting the reaction mixture in a continuously operated reaction vessel cascade comprising at least two reactors.

17 Claims, 2 Drawing Sheets

PROCESS FOR THE CONTINUOUS PREPARATION OF ROSINS

STATE OF THE ART

Resins for the printing inks industry are prepared predominantly on the basis of colophony. These colophony resins, or rosins, are formed when the resin acids of colophony undergo certain reactions such as polycondensation, Dieis-Alder adduct formation, addition, esterification and the formation of salts. These reactions take place in some cases in parallel and in some cases sequentially, and are conventionally carried out by a batchwise procedure, optionally in a plurality of steps, at temperatures between 150° and 300° C. The advantage of this procedure is that homogeneous distribution of the reactants and products and a uniform temperature in the reactor are certain at all times. The reaction can be monitored by determining simple characteristic variables.

After the end of the reaction, the resin prepared is dis-charged from the reactor and brought into a form in which it can be handled (e.g. flakes or pellets). For this purpose, it is common to employ a continuously operating cooling belt. In the course of discharge from the hot reaction vessel, instability is frequently observed in the viscosity of the melt, which is apparently occasioned by a buildup or degradation reaction accompanied by a change in the size of the molecule (change in molar mass) of the resin. This leads to instances of fluctuation in the properties of the resin and in the products produced therefrom.

OBJECTS OF THE INVENTION

It is an object of the invention to provide an improved process for the preparation of rosins of consistent uniform properties in a continuous process.

This and other objects and advantages of the invention will become obvious from the following detailed description.

THE INVENTION

In the process of the invention for the continuous production of rosins of consistent uniform properties based on colophony resins, the improvement comprises reacting the reaction mixture in a continuously operated reaction vessel cascade comprising at least two reaction vessels.

Continuous processes for the preparation of chemical sub-stances are known. They are employed, for example, in the pre-paration of polymers by addition or condensation polymerization of the respective monomers. In this context, however, the reaction products must be stable under the reaction conditions, which means, in this case, that there must no longer be any change in molar mass after the reaction has been concluded. Since in the case of the rosins, such a change, on discharge from the reaction vessel after the condensation step, is observed to be a function of time, a continuous process in the case of this reaction is not advantageous due to the residence time spectrum of such reactors. For this reason, industry also uses only batchwise processes.

The invention relates, then, to a continuous process for the preparation of rosins in which the reaction mixture is reacted in a continuously operated reaction vessel cascade comprising at least two reactors, preferably at least three reactors.

Figure 1:
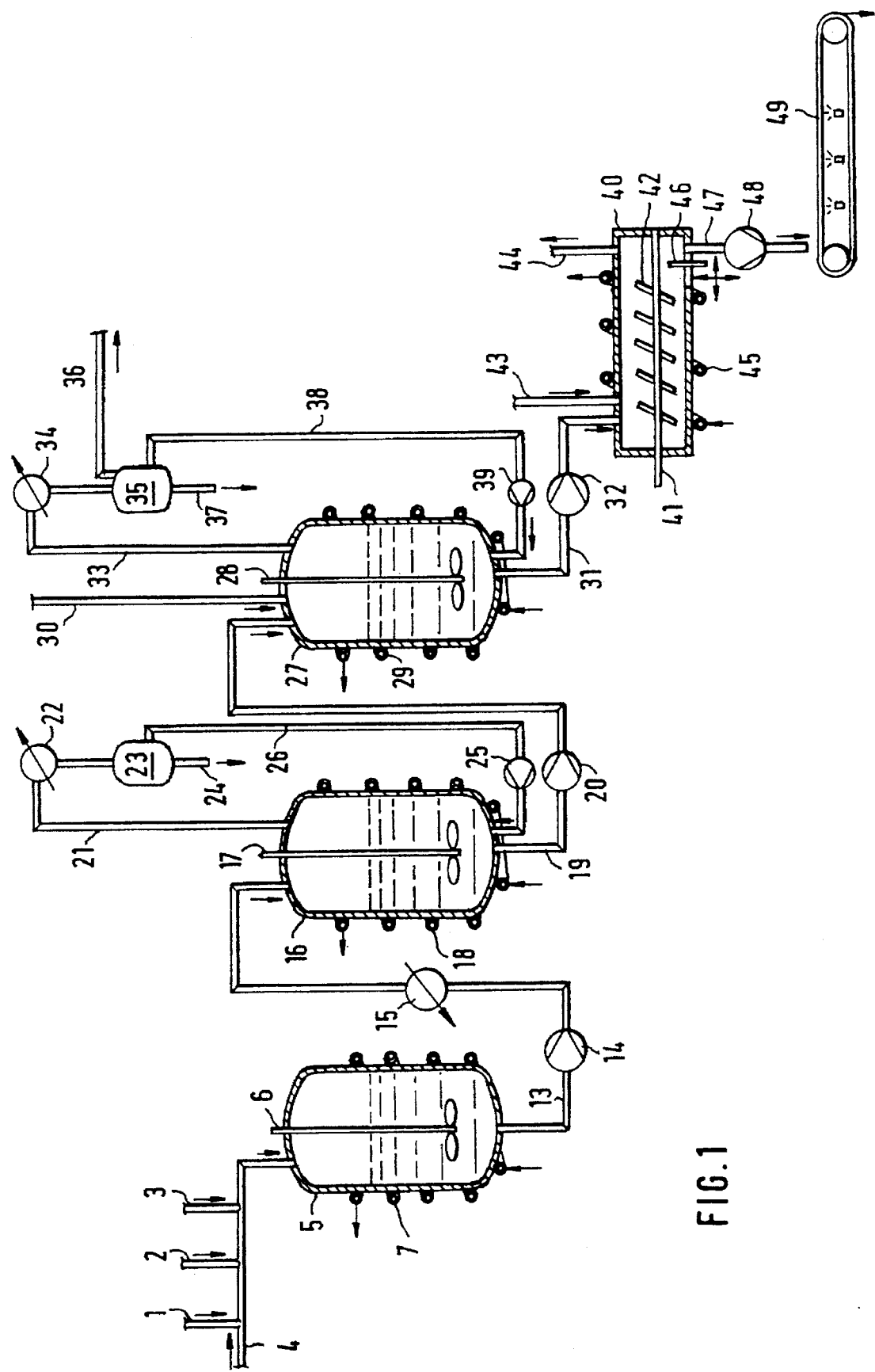
FIG. 1 illustrates the apparatus for a fully continuous process for the preparation of rosins.

In one embodiment of the invention, illustrated by FIG. 1 (fully continuous process), the starting materials are metered continuously through lines 1, 2, 3 and 4 into first vessel 5 which is equipped with a stirrer 6 and with a heating coil 7. In this vessel 5, the starting materials undergo partial reaction and then they pass through a line 13 via a metering device 14 and a heat exchanger 15 into reactor 16 and, preferably, there-after into at least one further reactor 27, where they are reacted further under similar conditions to those in the first reactor. In reactor 16, the reaction takes place with stirring with stirrer 17 and with heating by heating coil 18. During this reaction, water, optionally together with an entrainer, is led through the vapor tube 21 into a condenser 22.

In a separator or a simple column 23, water and entrainer are separated, and the entrainer is recycled to reactor 16, preferably below the surface of the reaction mixture through pipe 26 via metering device 25. The reaction mixture from reactor 16 is led through pipe 19 and metering device 20 into reactor 27 where it is subjected to further reaction with stirring by stirrer 28 and heating by heating coil 29. Further additives can be metered in through pipe 30. The reaction in the reactor 27 is preferably carried out under reduced pressure, with subatmospheric pressure being applied via line 36. Via vapor tube 33, a mixture of water and entrainer is distilled off as in the previous reactor, and the vapors are condensed in heat exchanger 34 and separated, in water separator 35 (or a simple column), into an aqueous and an organic phase. The organic phase (entrainer with or without volatile reactants) is recycled below the level of the reaction mixture via line 38 and pump 39.

The product leaves the reactor through pipe 31, and can alternatively be subjected to further reaction in an identical reactor $27^1$ or a plurality of identical reactors $27^1, 27^2, \ldots, 27^n$, discharged directly via pump 32 onto cooling belt 49, where it is solidified, or subjected to further reaction in a tube reactor 40 to complete the reaction. Tube reactor 40, which is preferably disposed horizontally, is provided with a heating coil 45 and with a driven shaft 41 which carries paddles 42. By means of an adjust-able weir 46, the residence time in the tube reactor can be adapted. If desired, further substances can be fed in through feed line 43, while volatile reaction products are removed through line 44, optionally by way of a vacuum pump (not shown). The product is discharged from the tube reactor via product line 47 by pump 48 onto cooling belt 49.

Preferably, this process is carried out such that the starting materials are metered continuously into a heated stirred reactor 5, and are stirred and partially reacted at temperatures of from 140° to 180° C., at a pressure of from 1 to 6 bar and with an average residence time of from 2 to 10 hours, the mixture is then pumped continuously via a metering device 14 and a heat exchanger 15 into a stirred reactor 16, the reaction is continued in reactor 16 with an average residence time of from 2 to 10 hours, at a temperature of from 240° to 300° C. and at a pressure of from 0.1 to 6 bar, continuously, at a constant filling level, the reaction product is pumped continuously into a second (27) or a plurality of further reactors ($27^1, 27^2, \ldots, 27^n$) where it is condensed further under the same conditions as those specified above, and the reaction product is aftertreated, optionally in a special high-viscosity reactor 40, and then is continuously discharged via a cooling belt 49.

Figure 2:
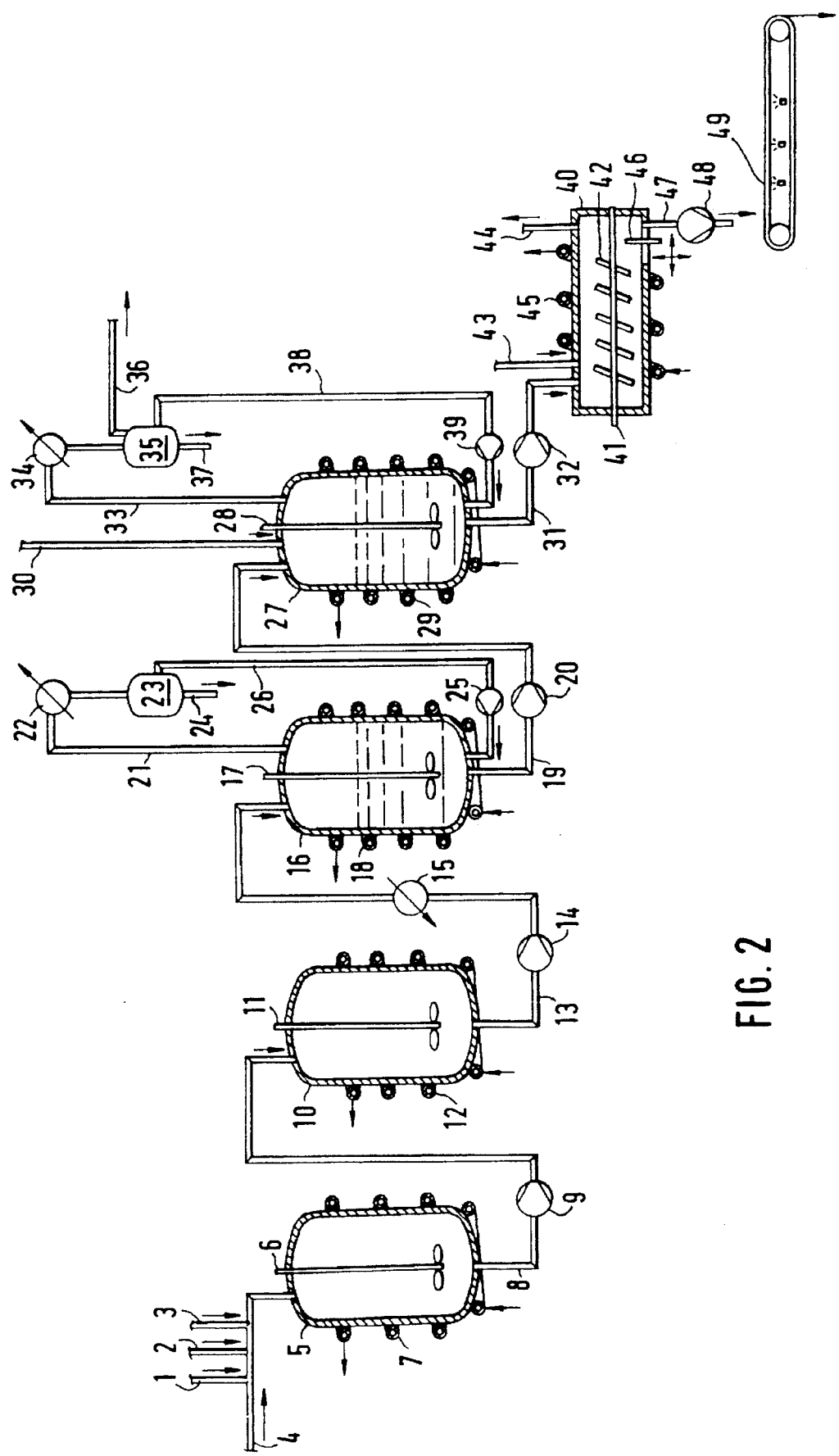
FIG. 2 illustrates the apparatus for a semi-continuous process for the preparation of rosins.

FIG. 2 illustrates a semicontinuous process wherein the starting materials are metered discontinuously through lines 1, 2, 3 and 4 into first vessel 5 equipped with a stirrer 6 and with a heating coil 7. The starting materials are partially reacted in vessel 5, and then they pass through line 8 via metering device 9 into intermediate vessel 10, which is equipped with stirrer 11 and heater 12. From there, they are metered continuously into first reactor 16 through line 13 and metering pump 14 by heat exchanger 15 which reactor is also provided with stirrer 17 and heater 18. Reaction continues in reactor 16 and during this reaction, water, optionally together with an entrainer, is led through vapor tube 21 into condenser 22. In separator 23, water and entrainer are separated, and the entrainer is recycled to reactor 16, preferably below the surface of the reaction mixture, through pipe 26 via metering device 25. The reaction mixture from reactor 16 is led through pipe 19 and metering device 20 into reactor 27 and is reacted further, with stirring by stirrer 28 and heating by heating coil 29. Further additives can be metered in through pipe 30.

The reaction in reactor 27 is preferably carried out under reduced pressure, with subatmospheric pressure being applied via line 36. A mixture of water and entrainer is distilled off via vapor tube 33 as in the previous reactor, and the vapors are condensed in heat exchanger 34 and separated, in water separator 35, into an aqueous phase and an organic phase. The organic phase (entrainer with or without volatile reactants) is recycled below the level of the reaction mixture via line 38 and pump 39. The product leaves reactor 27 through pipe 31, and can alternatively be subjected to further reaction in an identical reactor 27$^1$ (or a plurality of identical reactors 27$^1$, 27$^2$, ..., 27$^n$), discharged directly via pump 32 onto cooling belt 49, where it is solidified, or reacted further in tube reactor 40 to complete the reaction. The tube reactor, which is preferably disposed horizontally, is provided with heating coil 45 and with driven shaft 41 which carries paddles 42. By an adjustable weir 46, the residence time in the tube reactor can be adapted. If desired, further substances can be fed in through feed line 43, while volatile reaction products are removed through line 44, optionally by a vacuum pump (not shown). The product is discharged from tube reactor 40 via product line 47 by pump 48 onto cooling belt 49.

Preferably, this process is carried out such that the starting materials are mixed in a heated vessel 5 and subjected to partial reaction at a temperature of from 140° to 180° C., at a pressure of from 1 to 6 bar and with an average residence time of from 1 to 5 hours, the mixture is then pumped into a second heated and stirred intermediate vessel 10, from which it is pumped continuously via metering device 14 and heat exchanger 15 into stirred reactor 16, the reaction is continued in reactor 16 with an average residence time of from 2 to 10 hours, at a temperature of from 240° to 300° C. and at a pressure of from 0.1 to 6 bar, continuously, at a constant filling level, the intermediate product is pumped continuously into one (27) or more further reactors (27$^1$, 27$^2$, ..., 27$^n$) where it is condensed further under the same conditions as those specified above, and is optionally aftertreated in a special high-viscosity reactor 40, and finally the product is continuously discharged via cooling belt 49.

In accordance with the invention, the conventional starting materials for the preparation of rosins are used. These comprise the colophony itself, dienophiles which are able to react with the resin acids in a Diels-Alder-type addition, hydroxy-functional compounds, such as mono- and polyhydric alcohols and phenols, compounds having activated carbon-carbon double bonds such as cyclopentadiene or oligomers thereof, onto which the resin acids can be added by way of the carboxyl functionality, etc.

Preferred rosins for the invention are those which are prepared by single- or multi-stage reaction from colophony, carboxy-functional dienophiles and di- or polyhydric alcohols and/or phenols. Preferred are rosins which are prepared by reaction with maleic anhydride, polyhydric aliphatic alcohols and resols.

Colophony is obtained from crude pinewood balsam, from root extracts or from tall oil and constitutes a mixture of resin acids, with abietic acid and its isomer, levopimaric acid, making up the major fraction. In the mixture, these acids form an amorphous solid. The color of the colophony varies, depending on its origin, between pale yellow and dark brown. All conventional industrial grades of colophony can be used for this invention.

For application in the printing inks sector, it is preferred to employ light-colored grades. Abietic acid and levopimaric acid possess two carbon-carbon double bonds separated by a single bond. Compounds having a carbon-carbon double bond which is activated by electronegative groups in the vicinity can undergo addition, in a Diels-Alder-type addition, onto abietic acid and its isomers. If the dienophile employed is the anhydride of an olefinically unsaturated carboxylic acid such as maleic anhydride, for example, then the carboxyl functionality is increased and additional reactions become possible. The esterification of a colophony modified with maleic anhydride in this way with an alcohol component leads to products which are different from those formed in the simultaneous reaction of colophony with maleic anhydride and the alcohol component.

Rosins which are particularly suitable for use as printing ink resins are those prepared by reacting colophony with dienophiles in a Dieis-Alder-type addition and with polyhydric alcohols and/or resols.

The dienophiles which are suitable for the invention are substances having a carbon-carbon double or triple bond which is activated by electronegative substituents. Examples of suitable electronegative substituents are carboxyl and carboxylic anhydride groups, aldehyde and ketone groups, and cyano groups. Consequently, examples of preferred dienophiles are maleic anhydride, (meth)acrylic acid, itaconic acid, p-benzoquinone, (meth)acrolein and tetracyanoethylene, with acid-activated dienophiles such as maleic anhydride being particularly preferred.

The hydroxy compounds, alcohols and phenols are selected from the di- and polyhydric aliphatic, cycloaliphatic and araliphatic alcohols and from the mono-or polycyclic di- or polyhydric aromatic hydroxy compounds, in which two or more aromatic rings may be linked to one another by direct bonds or via divalent groups such as alkylene, ether, ketone or sulfone groups. Preference is given to polyhydric aliphatic alcohols such as glycerol, neopentylglycol, pentaerythritol, and sorbitol.

The resols which are suitable for the invention are obtained by alkaline condensation of phenol or of substituted phenols with formaldehyde. The resols preferably react to form methylene bridges at a site of minimal steric hindrance in the diene structure of the resin acids.

Compounds having electron-rich carbon-carbon double bonds react with the resin acids by addition of the carboxyl group onto the double bond. Preferred compounds having electron-rich carbon-carbon double bonds are, for example, cyclopentadiene or its oligomers, which are marketed, for example, under the trade name ®Escorez.

The process of the invention is, therefore, carried out either fully continuously in accordance with FIG. 1 and the accompanying explanations or semicontinuously in accordance with FIG. 2 and the accompanying explanations. In the fully continuous process, all of the starting materials are metered in liquid or solid form into vessel 5 where optionally they are melted. Esterification catalysts are also added to the starting materials, suitable examples being oxides of alkali metals and of alkaline earth metals.

In the semicontinuous process, the starting materials are placed one after the other into vessel 5 and optionally are melted. Reactions may take place even at this stage. The homogenized mixture is then conveyed via line 8 into intermediate vessel 10. The mixture passes from vessel 5 (continuous process) or from intermediate vessel 10, by means of gear pump 14 and heat exchanger 15, into first reaction vessel 16, in which it is held for a period of from 2 to 10 hours with stirring at a temperature of from 240° to 300° C., preferably from 250° to 270° C. and, with particular preference, between 255° and 265° C. and at a pressure of from 0.1 to 6 bar, preferably from 0.9 to 1.3 bar and, with particular preference, from 0.95 to 1.1 bar. Under these reaction conditions, esterification begins and the water of reaction is distilled off. To complete the reaction, the water of reaction can be distilled off by adding an entrainer, which is preferably metered into reactor 16 again below the level of the reaction mixture by pump 25. Water and entrainer can be separated in simple column 23, with the entrainer being recycled.

From first reaction vessel 16, the composition is conveyed by gear pump 20 into second reaction vessel 27 and is reacted further at a temperature of from 240° to 300° C., preferably from 250° to 270° C. and, with particular preference, from 255° to 265° C. and at a pressure of from 0.1 to 6 bar, preferably from 0.1 to 1.3 bar and, with particular preference, from 0.1 to 1.1 bar, optionally with stirring using an agitator run close to the wall, and with an average residence time of from 2 to 10 hours, preferably from 4 to 6 hours.

If desired, there may be disposed downstream of reactor 27 further analogous reactors having the same peripheral equipment. In this case, the reaction product is conveyed out of reactor 27 via gear pump 32 into reactor $27^1$, and from there via gear pump $32^1$ into reactor $27^2$, etc.

As a further variant, it is possible for high-viscosity melts continuously to discharge product from last reaction vessel 27 (or $27^1$, $27^2$, etc.) into tube reactor 40 which is preferably disposed horizontally. This reactor is provided with a forced-conveyor device; it is possible, for example, to use central shaft 41 fitted with paddles 42 or vanes. The residence time in tube reactor 40 can be adapted by weirs 46. The tube reactor is operated in the same temperature range as the second reaction vessel 27. The esterification reaction can be assisted by applying subatmospheric pressure in this piece of equipment, with a pressure range of from 0.1 to 1.0 bar, preferably from 0.1 to 0.5 bar, being usual. The residence time in this reactor is adjusted in accordance with the desired product properties, and is usually from 0.5 to 6 hours, preferably from 1 to 3 hours.

The finished rosin is discharged from reactor 27 onto continuously operated cooling belt 49 by gear pump 32. For the cases of the variants, discharge takes place from last reactor $27^n$ by means of gear pump $32^n$, or from the tube reactor by gear pump 48. In this procedure, the resin is solidified in flake form or, preferably, in the form of pellets.

Additives can be introduced into reactors 27 (or $27^1$ etc. and into tube reactor 40) via lines 30 (or $30^1$ etc. and 43).

In accordance with a further process variant, only rosin and dienophile are placed into a reactor located upstream of first vessel 5, so that premature reaction of a carboxy-functional dienophile with the hydroxyl-functional component can be reliably avoided. Only after completion of the Diels-Alder addition is the hydroxy-functional component added, optionally in combination with an esterification catalyst.

The product prepared by the process of the invention is distinguished by uniform properties and a light color, especially in comparison with batchwise-prepared product from conventional processes. Moreover, the products prepared by the continuous process, for the same chemical composition, give the printing inks, preferably those for halftone gravure printing with toluene, after proof printing, an advantageous, higher gloss than the printing inks formulated with binder resins prepared by batchwise processes. This difference was unforeseeable and must therefore be classified as extremely surprising.

In addition, it is possible by the continuous procedure to dispense with numerous batch tests which are necessary with batchwise operation. The process is stable after only a short time.

In the following examples, there are described several preferred embodiments to illustrate the invention. However, it is to be understood that the invention is not intended to be limited to the specific embodiments.

EXAMPLES

For experimental purposes, a plant was constructed which was suitable for the continuous preparation of modified rosins. It essentially consisted of a 1 m³ mixing reactor 5 which was connected via a line 13 equipped with a heating jacket, a gear pump 14 and a heat exchanger 15 to a further 1 m³ reactor 16. The reactor 16 was connected via a pipeline 19 with gear pump 20 to a further 1 m³ reactor 27, which, ultimately, was connected via a pipeline 31 with gear pump 32 to a cooling belt 49. All of the reactors were equipped with a stirrer mechanism, a distillation apparatus and a water separator. In this way, the reaction mixture could be readily homogenized, and volatile constituents of the mixture such as water or resin oils could be distilled off from the product stream.

The mixing reactor 5 was fed continuously with the starting materials via suitable metering devices (e.g. pumps or conveying screws). The procedure envisaged that the starting materials were metered into the mixing reactor 5 so that in this reactor, there was a reaction mixture of defined composition (specified as mass content or mass fraction, in %, the sum of all the starting materials employed making up 100%) with an average residence time V at the desired temperature T and at the pressure P. The product stream passing into the reactor 16 had therein an average residence time $V_1$ at a temperature $T_1$ and a pressure $P_1$ and in the reactor 27, a residence time $V_2$ at a temperature $T_2$ and a pressure $P_2$.

The average residence times (hours, h) were regulated by the conveying speed of the gear pumps and by the level in the reactors, while the temperature (° C.) was regulated by the heating system of the reactors, which could be operated with steam or by a heat-transfer oil. Pressures above 1 bar were brought about by inert gas pressure (e.g. nitrogen) or by the vapor pressure of the product stream, while pressures below 1 bar were generated by vacuum pumps.

For the experiments, an operating period of 120 hours was selected in each case. After an operating period of from about 15 to 20 hours, in every case a product having consistent properties was being produced, a fact which was tested by resin samples taken from the cooling belt at intervals of 5 hours and by the determination of specific properties. For this purpose, the solution viscosities were determined in the conventional vehicles which are relevant for printing ink resins, for example toluene for binder resins for halftone gravure printing inks, or linseed oil or mineral oil for binder resins for offset printing inks.

Unless otherwise specified, when maleic anhydride was used, it was metered in not directly but in the form of its known reaction product with colophony. The viscosities were determined using a conventional rotary viscometer in accordance with DIN 53229, and the brightness of the resins was determined by means of the iodine color number in accordance with DIN 6162. The phenol-formaldehyde condensation products were prepared by the known methods which are conventional in the chemistry of phenolic resins.

Example 1

Preparation of a binder resin for halftone gravure printing inks with toluene

Mixing reactor 5: Reaction mixture comprising
72.6% colophony
3.5% maleic anhydride
9.8% pentaerythritol
1.2% glycerol
5.2% of an aqueous p-tert-butylphenol-formaldehyde condensation product (70% strength in water, viscosity 280 mPa. s/23° C.)
5.8% of an aqueous phenol-formaldehyde condensation product (70% strength in water, viscosity 300 mPa·s/23° C.)
1.9% zinc oxide
V=5 hours, T=160° C., P=1.5 bar
Reactor 16: $V_1$=5 hours, $T_1$=255° C., $P_1$=1 bar
Reactor 27: $V_2$=5 hours, $T_2$=255° C., $P_2$=200 mbar
Cooling belt 49: Resin viscosity, 50% strength in toluene: 430 to 520 mPa·s/23° C.

Example 2

Process similar to Example 1 but with altered pressure in reactor 2

Mixing reactor 5: Reaction mixture comprising
72.6% colophony
3.5% maleic anhydride
9.8% pentaerythritol
1.2% glycerol
5.2% of an aqueous p-tert-butylphenol-formaldehyde condensation product (70% strength in water, viscosity 280 mPa-s/23° C.)
5.8% of an aqueous phenol-formaldehyde condensation product (70% strength in water, viscosity 300 mPa·s/23° C.)
1.9% zinc oxide
V=5 hours, T=160° C., P=1.5 bar
Reactor 16: $V_1$=6 hours, $T_1$=255° C., $P_1$=1 bar
Reactor 27: $V_2$=6 hours, $T_2$=255° C., $P_2$=100 mbar
Cooling belt 49: Resin viscosity, 50% strength in toluene: 750 to 910 mPa. s/23° C.

Example 3

Preparation of a binder resin for offset printing inks
Mixing reactor 5: Reaction mixture comprising
67.8% colophony
3.2% maleic anhydride
9.2% pentaerythritol
19.0% of an aqueous nonylphenol/diphenylolpropane-formaldehyde condensation product (70% strength in water, viscosity 270 mPa. s/23° C.)
0.8% magnesium oxide
V=5 hours, T=160° C., P=1.5 bar
Reactor 16: $V_1$=6 hours, $T_1$=265° C., $P_1$=1 bar
Reactor 27: $V_2$=5 hours, $T_2$=255° C., $P_2$=100 mbar
Cooling belt 49: Resin viscosity, 35% strength in linseed oil: 450 to 710 dPa·s/23° C.

Example 4

Preparation of a binder resin for offset printing inks
Mixing reactor 5: Reaction mixture comprising
58.2% colophony
5.2% glycerol
26.5% nonylphenol
2.0% diphenylolpropane
0.6% magnesium oxide
7.5% paraformaldehyde
V=5 hours, T=160° C., P=4 bar
Reactor 16: $V_1$=5 hours, $T_1$=240° C., $P_1$=1 bar Water was removed by azeotropic distillation with xylene
Reactor 27: $V_2$=2 hours, $T_2$=230° C., $P_2$=100 mbar
Cooling belt 49: Resin viscosity, 35% strength in mineral oil with a boiling range of 240° to 270° C. and with an aniline point at 72° C.: 350 to 510 dPa·s/23° C.
Iodine color number: 80 mg of iodine/100 ml

Example 5

Preparation of a binder resin for offset printing inks
Mixing reactor 5: Reaction mixture comprising
45.4% colophony
4.7% dicyclopentadiene resin
2.4% maleic anhydride
7.1% cocoa butter
6.5% pentaerythritol
26.4% nonylphenol
0.6% magnesium oxide
6.9% paraformaldehyde
V=5 hours, T=160° C., P=4 bar
Reactor 16: $V_1$=5 hours, $T_1$=250° C., $P_1$=1 bar Water was removed by azeotropic distillation with xylene
Reactor 27: $V_2$=2 hours, $T_2$=250° C., $P_2$=100 mbar
Cooling belt 49: Resin viscosity, 30% strength in mineral oil with a boiling range of 240° to 270° C. and with an aniline point at 72° C.: 100 to 150 dPa·s/23° C.

Comparison Example 1

Using the composition of Example 1, a phenolic resin-modified rosin was prepared by a batchwise procedure in a conventional apparatus with a stirrer mechanism and a distillation device:

Colophony and maleic anhydride were heated at 160° C. for 30 minutes. Then, pentaerythritol, glycerol, the two phenol- and p-tert-butylphenol-formaldehyde condensation products and the zinc oxide were added. Subsequently, the mixture was heated at 255° C. while distilling off water. After the acid number had fallen to below 50 mg of KOH/g of resin, a vacuum of 100 mbar was applied until the resin viscosity had risen to from 430 to 520 mPa·s/23° C. (50% strength in toluene).

Performance comparison:

Using conventional methods, the binder resin of Example 1 (ink A) were the binder resin of Comparison Example 1 (ink B) are processed by dispersion for half an hour in a ball mill of
24 g of binder resin
9 g of the pigment Litholrubin (BASF AG)
67 g of toluene
to prepare inks for halftone gravure printing, and paper was printed by the gravure process. The gloss of the proof prints, which should be as high as possible to achieve a good printing result, was then measured using a Lange laboratory reflectometer at an angle of incidence of 60°. Ink A, with 57% reflected light, gave a distinctly more glossy proof print than ink B, at 52%.

Comparison Example 2

Using the composition of the binder resin of Example 4, a phenolic resin-modified rosin was prepared by a batchwise procedure in a conventional 12 m$^3$ reactor with a stirrer mechanism and a distillation device:

Colophony, glycerol, nonylphenol and diphenylolpropane, magnesium oxide and paraformaldehyde were heated at 160° C. for 3 hours, with a pressure of 4 bar becoming established. The reactor was then evacuated and the contents were heated to 240° C., the water formed being distilled off azeotropically with xylene as entrainer when a temperature of 200° C. was reached. After the acid number had fallen to below 30 mg of KOH/g of resin, volatile constituents were evacuated at 100 mbar for 30 minutes. The contents of the reactor were then discharged onto a cooling belt, about 5 hours being required for this procedure at a reactor yield of 7.5 t. A resin sample taken right at the beginning of the discharge operation showed a viscosity of 490 dPaos (35% strength in mineral oil with a boiling range of 240° to 270° C. and with an aniline point at 72° C.), whereas a resin sample taken at the end of the discharge operation has a viscosity of only 125 dPa·s. For uniformity of production, this difference was too large. Moreover, the resin had an iodine color number of 110 mg of iodine/100 ml and thus a disadvantage-ously greater coloration than the resin of Example 4.

Various modifications of the process of the invention may be made without departing from the spirit or scope thereof and it should be noted that the invention is intended to be limited only as defined in the appended claims.

What is claimed is:

1. In a process for the continuous production of rosins of consistent uniform properties based on colophony resins, the improvement comprising reacting the reaction mixture in a continuously operated reaction vessel cascade from at least two reactors.

2. The process of claim 1, wherein the continuously operated reaction vessel cascade comprises at least three reactors.

3. The process of claim 2, wherein the reaction is carried out in a total of three reactors operated continuously as a cascade.

4. The process of claim 2, wherein the starting products are metered continuously into a first reactor and are partially reacted therein.

5. The process of claim 2, wherein the reaction mixture is conveyed from a first continuously operated reactor via a metering device and a heat exchanger into a second reaction vessel.

6. The process of claim 2, wherein the reaction product from the second reaction vessel is reacted further in at least one further reaction vessel.

7. The process of claim 2, wherein the reaction in the first reactor is carried out at a temperature of from 140° to 180° C., at a pressure of from 1 to 6 bar and with an average residence time of from 2 to 10 hours.

8. The process of claim 2, wherein the reaction in the second and subsequent reactors is carried out at a temperature of from 240° to 300° C., at a pressure of from 0.1 to 6 bar and with an average residence time of from 2 to 10 hours.

9. The process of claim 2, wherein the last reactor of the continuously operated reaction vessel cascade is replaced by a tube reactor disposed horizontally and which is provided with a forced-conveyor device, wherein the geometry of the conveying element can be varied and the weirs can be adjusted.

10. The process of claim 1, wherein the starting materials are mixed in a heated reactor prior to continuous reaction and are partially reacted batchwise.

11. The process of claim 10, wherein the reaction composition from the batchwise-operated first reactor is conveyed into an intermediate vessel from which it continuously traverses a reaction vessel cascade comprising at least two reactors.

12. The process of claim 10, wherein the reaction in the first continuously operated reactor is continued at a temperature of from 240° to 300° C., at a pressure of from 0.1 to 6 bar and with an average residence time of from 2 to 10 hours.

13. The process of claim 10, wherein the reaction composition from the first continuously operated reactor is conveyed into at least one further continuously operated reaction vessel in which the reaction is continued within the same limits for the reaction parameters of temperature, pressure and residence time, and in which case the pressure is equal to or lower than the pressure in the preceding reactor, and/or the temperature and/or residence time are equal to or different from those in the preceding reactor.

14. The process of claim 11, wherein the reaction is carried out in two continuously operated reaction vessels.

15. The process of claim 11, wherein the reaction is carried out in two continuously operated reaction vessels and one subsequent tube reactor, which is disposed horizontally and which is provided with a forced-conveyor device, wherein the geometry of the conveying element can be varied and the weirs can be adjusted.

16. A rosin obtained by the process of claim 1.

17. A printing ink resin containing a rosin of claim 16.

* * * * *